(12) United States Patent
Bomba et al.

(10) Patent No.: US 11,964,440 B2
(45) Date of Patent: Apr. 23, 2024

(54) ROLLER DRUM PLUGGING OF HONEYCOMB BODIES

(71) Applicant: CORNING INCORPORATED, Corning, NY (US)

(72) Inventors: Richard Dominic Bomba, Horseheads, NY (US); Kevin Eugene Elliott, Horseheads, NY (US)

(73) Assignee: Corning Incorporated, Corning, NY (US)

(*) Notice: Subject to any disclaimer, the term of this patent is extended or adjusted under 35 U.S.C. 154(b) by 697 days.

(21) Appl. No.: 17/257,384

(22) PCT Filed: Jun. 26, 2019

(86) PCT No.: PCT/US2019/039169
§ 371 (c)(1),
(2) Date: Dec. 31, 2020

(87) PCT Pub. No.: WO2020/009853
PCT Pub. Date: Jan. 9, 2020

(65) Prior Publication Data
US 2021/0180489 A1    Jun. 17, 2021

Related U.S. Application Data

(60) Provisional application No. 62/693,670, filed on Jul. 3, 2018.

(51) Int. Cl.
*B29C 65/00* (2006.01)
*B28B 11/00* (2006.01)
(Continued)

(52) U.S. Cl.
CPC .......... *B29C 66/532* (2013.01); *B28B 11/007* (2013.01); *F01N 3/0222* (2013.01);
(Continued)

(58) Field of Classification Search
None
See application file for complete search history.

(56) References Cited

U.S. PATENT DOCUMENTS

2007/0182072 A1    8/2007  Ichikawa et al.
2008/0197534 A1    8/2008  Ichikawa
(Continued)

FOREIGN PATENT DOCUMENTS

CN    103600519 A    2/2014
EP       1997599 A1   12/2008
(Continued)

OTHER PUBLICATIONS

International Search Report and Written Opinion of the International Searching Authority; PCT/US19/39169; dated Nov. 8, 2019; 10 Pages; European Patent Office.

*Primary Examiner* — Christopher T Schatz
(74) *Attorney, Agent, or Firm* — Russell S. Magaziner

(57) ABSTRACT

A method of plugging a honeycomb body is disclosed herein, the method comprising: applying a mask layer to the honeycomb body defining a plurality of channels, wherein the mask layer defines a plurality of holes aligned with the plurality of channels; rotating a roller drum; moving the honeycomb body over the roller drum to define a nip between the roller drum and the honeycomb body; and inserting a plugging cement in the nip between the roller drum and the mask layer such that the roller drum forces the plugging cement through the plurality of holes of the mask layer into the plurality of channels of the honeycomb body.

17 Claims, 4 Drawing Sheets

(51) Int. Cl.
*F01N 3/022* (2006.01)
*B01D 46/24* (2006.01)

(52) U.S. Cl.
CPC ...... *B01D 46/2455* (2013.01); *B01D 46/2482* (2021.08); *B28B 11/006* (2013.01); *F01N 2330/06* (2013.01)

(56) References Cited

U.S. PATENT DOCUMENTS

| | | |
|---|---|---|
| 2009/0011180 A1 | 1/2009 | Ichikawa |
| 2009/0181167 A1 | 7/2009 | Kimura et al. |
| 2012/0321859 A1 | 12/2012 | Choi |

FOREIGN PATENT DOCUMENTS

| | | |
|---|---|---|
| EP | 2484504 A1 | 8/2012 |
| JP | 01-141732 A | 6/1989 |
| JP | 2002-126421 A | 5/2002 |
| KR | 10-2012-0063978 A | 6/2012 |

ROLLER DRUM PLUGGING OF HONEYCOMB BODIES

This is a national stage application under 35 U.S.C. § 371 of International Application No. PCT/US2019/039169, filed on Jun. 26, 2019, which claims the benefit of priority under 35 U.S.C. § 119 of U.S. Provisional Application Ser. No. 62/693,670 filed on Jul. 3, 2018, which is incorporated herein by reference in its entirety.

FIELD OF THE DISCLOSURE

The present disclosure generally relates to ceramic honeycomb bodies used as filters, and more specifically, to methods of plugging honeycomb bodies.

BACKGROUND

Ceramic wall flow filters typically have porous honeycomb structures with the plugs sealing alternate channels, which force exhaust gas flow through porous channel walls to exit from adjoining channels.

SUMMARY OF THE DISCLOSURE

A method of plugging a honeycomb body is disclosed herein, the method comprising: applying a mask layer to the honeycomb body defining a plurality of channels, wherein the mask layer defines a plurality of holes aligned with the plurality of channels; rotating a roller drum; moving the honeycomb body over the roller drum to define a nip between the roller drum and the honeycomb body; and inserting a plugging cement in the nip between the roller drum and the mask layer such that the roller drum forces the plugging cement through the plurality of holes of the mask layer into the plurality of channels of the honeycomb body.

Also disclosed herein is a method of plugging a honeycomb body, the method comprising: applying a mask layer to the honeycomb body defining a plurality of channels, wherein the mask layer defines a plurality of holes aligned with the plurality of channels; rotating a roller drum defining one or more embossed features; moving the honeycomb body over the embossed features of the roller drum to define a nip between the one or more embossed features and the mask layer; and inserting a plugging cement in the nip such that the one or more embossed features forces the plugging cement through the plurality of holes of the mask layer into the plurality of channels of the honeycomb body.

Also disclosed herein is a method of plugging a honeycomb body, the method comprising: applying a mask layer to the honeycomb body defining a plurality of channels, wherein the mask layer defines a plurality of holes aligned with the plurality of channels; rotating a roller drum defining a plurality of embossed features; moving the honeycomb body over the plurality of embossed features of the roller drum to define a nip between plurality of embossed features and the mask layer; and conveying a plugging cement along a carrier web through the nip between the embossed features of the roller drum and the mask layer such that the embossed features forces the plugging cement through the plurality of holes of the mask layer into the plurality of channels of the honeycomb body.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
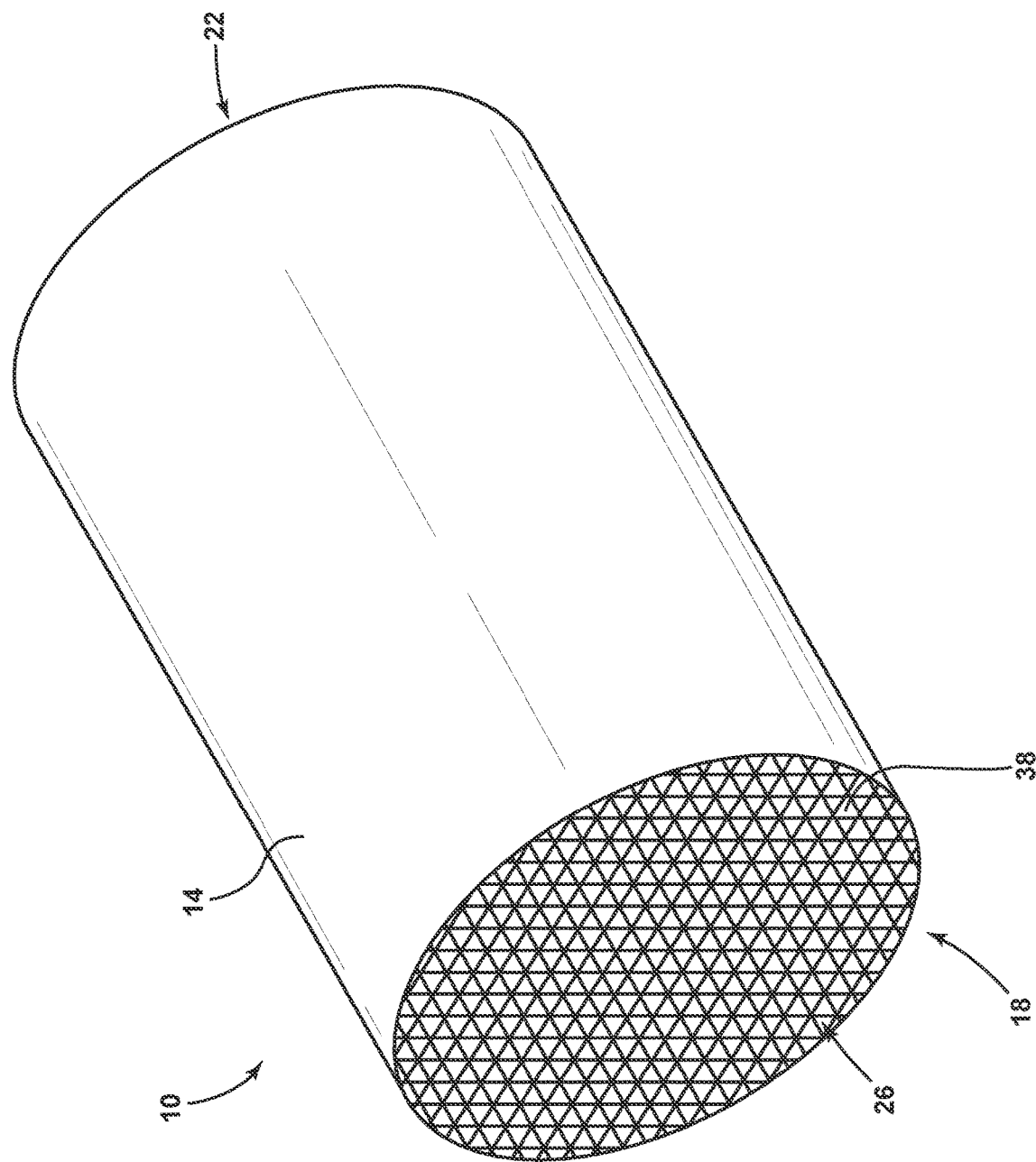
FIG. 1 is a perspective view of a filter, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The construction and arrangement of the elements of the present disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 2:
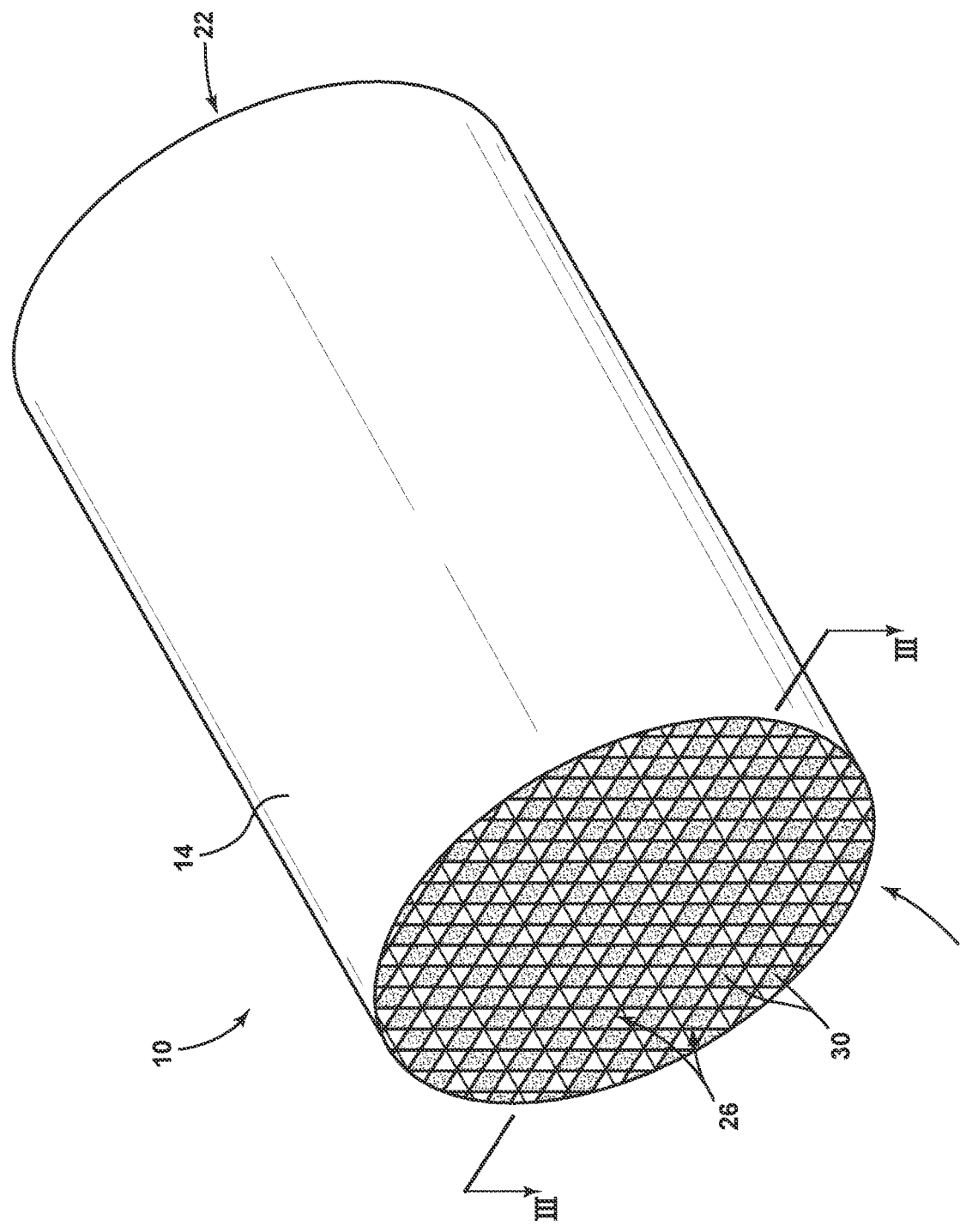
FIG. 2 is a perspective view of the filter depicted in FIG. 1 as including a plurality of plugs, according to at least one example.

FIGS. 1 and 2 show a filter 10 comprising a honeycomb body 14 comprising a first end 18 and a second end 22. The honeycomb body 14 comprises intersecting cell walls that form a plurality of channels 26 extending from the first end 18 to the second end 22. According to various examples, a filter 10 comprises a plurality of plugs 30 positioned within at least some of the channels 26, in some embodiments at first and second ends 18, 22, of the honeycomb body 14.

Referring now to FIG. 1, the honeycomb body 14 comprises a matrix of intersecting cell walls comprise thin, porous walls 38 which extend across and between the first and second ends 18, 22 to form a large number of adjoining channels 26. The channels 26 extend between and are open at the first and second ends 18, 22 of the honeycomb body 14. According to various examples, the channels 26 are mutually parallel with one another. The honeycomb body 14 may comprise a transverse cross-sectional channel density of from about 10 channels/in$^2$ to about 900 channels/in$^2$, or from about 20 channels/in$^2$ to about 800 channels/in$^2$, or from about 30 channels/in$^2$ to about 700 channels/in$^2$, or from about 40 channels/in$^2$ to about 600 channels/in$^2$, 50 channels/in$^2$ to about 500 channels/in$^2$, or from about 60 channels/in$^2$ to about 400 channels/in$^2$, or from about 70 channels/in$^2$ to about 300 channels/in$^2$, or from about 80 channels/in$^2$ to about 200 channels/in$^2$, or from about 90 channels/in$^2$ to about 100 channels/in$^2$, or form about or from about 100 channels/in$^2$ to about 200 channels/in$^2$ or any and all values and ranges therebetween. The walls 38 may have a thickness in mils (i.e., thousands of an inch) of from about 1 mil to about 15 mils, or from about 1 mil to about 14 mils, or from about 1 mil to about 13 mils, or from about 1 mil to about 12 mils, or from about 1 mil to about 11 mils, or from about 1 mil to about 10 mils, or from about 1 mil to about 9 mils, or from about 1 mil to about 8 mils, or from about 1 mil to about 7 mils, or from about 1 mil to about 14 mils, or from about 1 mil to about 6 mils, or from about 1 mil to about 5 mils, or from about 1 mil to about 4 mils, or from about 1 mil to about 3 mils, or from about 1 mil to about 2 mils or any and all values and ranges therebetween. It will be understood that although the channels 26 are depicted with a generally square cross-sectional shape, the channels 26 may have a circular, triangular, rectangular, pentagonal or higher order polygon cross-sectional shape without departing from the teachings provided herein.

The honeycomb body 14 may be formed of a variety of materials including ceramics, glass-ceramics, glasses, metals, and by a variety of methods depending upon the material selected. According to various examples, a green body which is transformed into honeycomb body 14 may be initially fabricated from plastically formable and sinterable finely divided particles of substances that yield a porous material after being fired. Suitable materials for a green body which is formed into the honeycomb body 14 comprise metallics, ceramics, glass-ceramics, and other ceramic based mixtures. In some embodiments, the honeycomb body 14 is comprised of a cordierite (e.g., $2MgO \cdot 2Al_2O_3 \cdot 5SiO_2$) material.

Referring to FIG. 2, the filter 10 can be formed from the honeycomb body 14 by closing or sealing a first subset of channels 26, such as at the first end 18 with plugs 30, and the remaining channels 26 (for example alternating channels 26) being closed at the second end 22 of the honeycomb body 14, using other plugs 30. In operation of the filter 10, fluids such as gases carrying solid particulates are brought under pressure to the inlet face (e.g., the first end 18). The gases then enter the honeycomb body 14 via the channels 26 which have an open end at the first end 18, pass through the walls 38 of the porous cell walls, and out the channels 26 which have an open and at the second end 22. Passing of the gasses through the walls 38 may allow the particulate matter in the gases to remain trapped by the walls 38.

Figure 3:
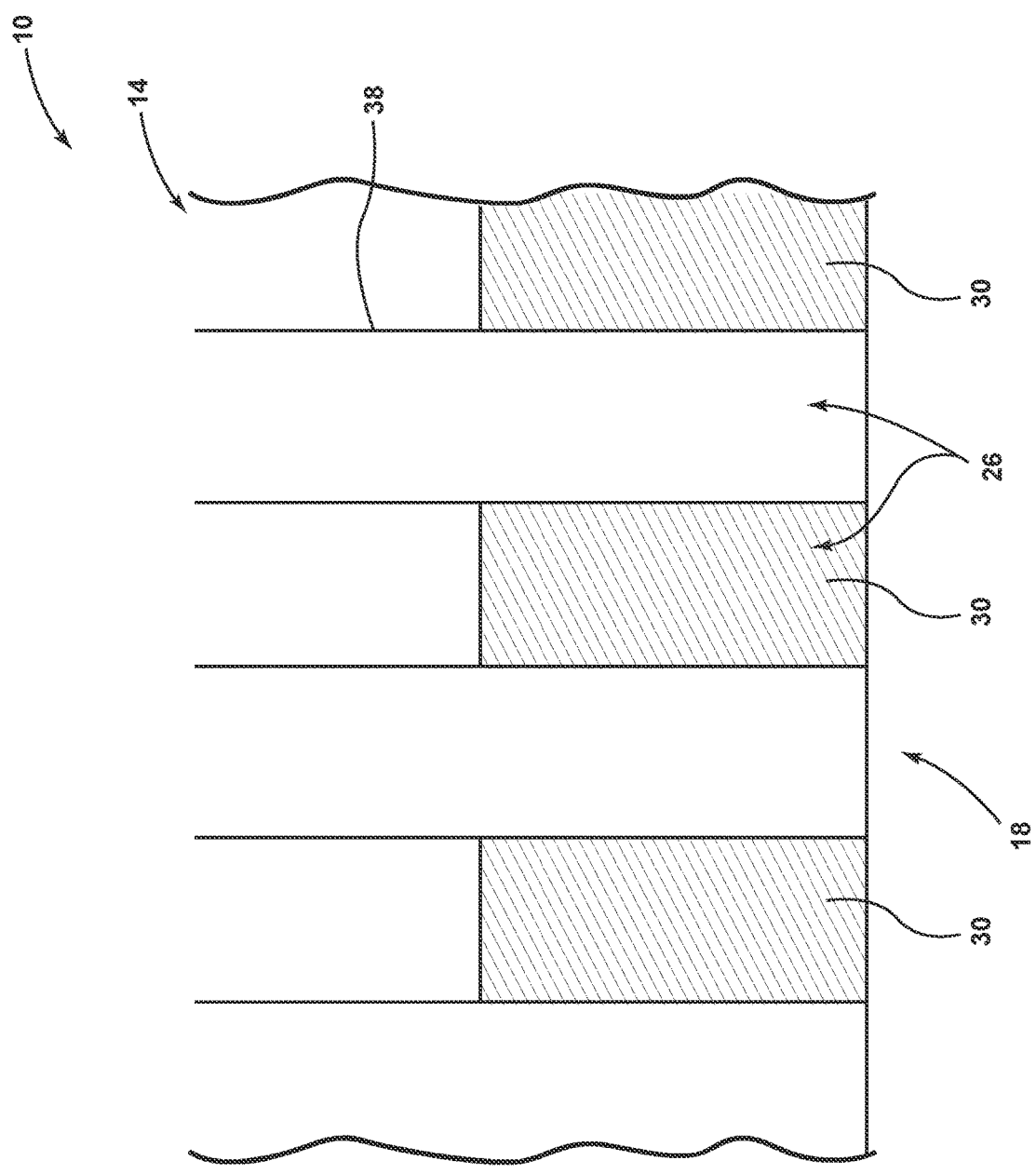
FIG. 3 is a cross-sectional view taken at line of FIG. 2, according to at least one example.

As schematically illustrated in FIGS. 2 and 3, plugs 30 may be positioned in the channels 26 in an alternating manner. In the depicted example, the plugs 30 are positioned across the first and second ends 18, 22 of the honeycomb body 14 in a "checkerboard" pattern, but it will be understood that other patterns may also be applied. In the checkerboard pattern, each of an open channel's 26 nearest neighbor channels 26 on an end (e.g., either the first or second end 18, 22) includes a plug 30.

The plugs 30 may have an axial length, or longest dimension extending substantially parallel with the channels 26, of about 0.5 mm or greater, of about 1 mm or greater, of about 1.5 mm or greater, of about 2 mm or greater, of about 2.5 mm or greater, of about 3 mm or greater, of about 3.5 mm or greater, of about 4 mm or greater, of about 4.5 mm or greater, of about 5 mm or greater, of about 5.5 mm or greater, of about 6.0 mm or greater, of about 6.5 mm or greater. For example, the plugs 30 may have an axial length of from about 0.5 mm to about 10 mm, or from about 1 mm to about 9 mm, or from about 1 mm to about 8 mm, or from about 1 mm to about 7 mm, or from about 1 mm to about 6 mm, or from about 1 mm to about 5 mm, or from about 1 mm to about 4 mm, or from about 1 mm to about 3 mm, or from about 1 mm to about 2 mm or any and all value and ranges therebetween. According to various examples, the plurality of plugs 30 located on the first end 18 of the body 14 may have a different length than the plugs 30 positioned on the second end 22 of the body 14.

The variation in length for a plurality of plugs 30 may be expressed as a standard deviation and is calculated as the square root of variance by determining the variation between each length relative to the average length of the plugs 30. The standard deviation of the plurality of plugs 30 is a measure of the variance in the length of plugs 30 positioned, for example, on either the first or second ends 18, 22 of the honeycomb body 14. All of the plurality of plugs 30 on one end (e.g., the first or second end 18, 22) may have a standard deviation in length of from about 0.1 mm to about 3.0 mm. For example, a standard deviation in length of the plugs 30 may be about 3.0 mm or less, about 2.9 mm or less, about 2.8 mm or less, about 2.7 mm or less, about 2.6 mm or less, about 2.5 mm or less, about 2.4 mm or less, about 2.3 mm or less, about 2.2 mm or less, about 2.1 mm or less, about 2.0 mm or less, about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1.0 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm or less or any and all values and ranges therebetween. According to various examples, the plurality of plugs 30 located on the first end 18 of the body 14 may have a different standard deviation than the plugs 30 positioned on the second end 22 of the body 14.

Figure 4:
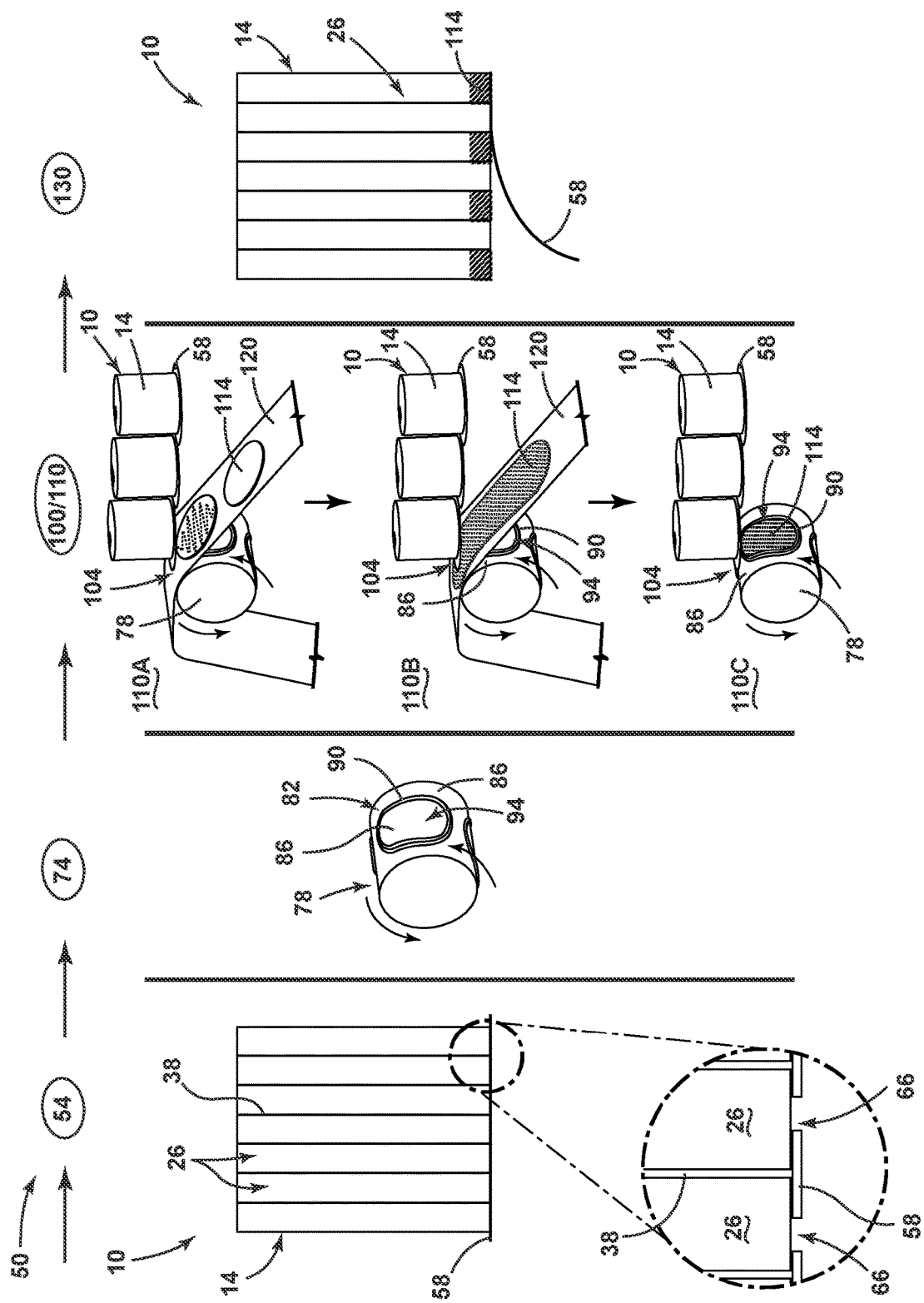
FIG. 4 is a schematic illustration of a method of forming the filter, according to at least one example.

Referring now to FIG. 4, depicted is a method 50 of forming the filter 10. The method 50 may begin with a step 54 of applying a mask layer 58 to the filter 10 defining the plurality of channels 26. According to various examples, the mask layer 58 defines a plurality of holes 66 aligned with the plurality of channels 26. The mask layer 58 may be applied to the first end 18 of the honeycomb body 14 and/or the second end 22 to cover the plurality of filter channels 26. The mask layer 58 may be comprised of a metal, polymer, a composite material and/or combinations thereof. For example, the mask layer 58 may be comprised of a rice paper, cellophane, plexiglass, biaxially-oriented polyethylene terephthalate, other materials and/or combinations thereof. A mask layer 58 can be positioned on the first and/or second ends 18, 22 of the honeycomb body 14. The mask layer 58 may cover a portion, a majority, substantially all or all of the first and/or second ends 18, 22. The mask layer 58 may have the same size and shape as the first and/or second ends 18, 22, or the size and/or shape of the mask layer 58 may be different. For example, the mask layer 58 may have the same general shape as a cross-section of the honeycomb body 14 (e.g., generally circular) and may have a greater diameter than the honeycomb body 14 such that the mask layer 58 extends radially outwardly from the honeycomb body 14. The mask layer 58 may extend outwardly from the honeycomb body 14 about 0.5 cm or greater, about 1.0 cm or greater, about 1.5 cm or greater, about 2.0 cm or greater, about 2.5 cm or greater, about 3.0 cm or greater, about 3.5 cm or greater, about 4.0 cm or greater, about 4.5 cm or greater, about 5.0 cm or greater, about 5.5 cm or greater, about 6.0 cm or greater or any and all values and ranges therebetween. The mask layer 58 may be coupled to the honeycomb body 14. For example, the honeycomb body 14 and/or mask layer 58 may have an adhesive adhered thereto, or disposed between, to allow sticking of the mask layer 58 to the honeycomb body 14. In another example, a band may be positioned around an exterior surface of the honeycomb body 14 to retain the mask layer 58 to the honeycomb body 14.

According to various examples, the mask layer 58 includes the plurality of holes 66 positioned across the mask layer 58. The holes 66 of the mask layer 58 may be formed prior to coupling of the mask layer 58 to the honeycomb body 14 or after. The holes 66 may be positioned in a pattern (e.g., a checkerboard-like pattern) across the mask layer 58. In checkerboard-like patterns, the holes 66 are positioned proximate every other channel 26 at a face (e.g., the first and/or second ends 18, 22). According to various examples, a plurality of holes 66 may be positioned over one or more of the channels 26. The holes 66 facilitate fluid communication between the channel 26 and an environment around the mask layer 58. The holes 66 may be formed through mechanical force (e.g., with a punch) or through a laser.

The holes 66 may take a variety of shapes. For example, the holes 66 may have a circular, oval, oblong, triangular, square, rectangular or higher order polygon shape. The holes 66 may have an area of from about 1% to about 80% of a cross-sectional area of the corresponding respective channel 26 aligned with the hole 66. For example, the holes 66 may have an area of about 80% or less, about 75% or less, about 70% or less, about 65% or less, about 55% or less, about 50% or less, about 45% or less, about 40% or less, about 35% or less, about 30% or less, about 25% or less, about 20% or less, about 15% or less, about 10% or less, about 5% or less of a cross-sectional area of the channel 26 proximate the holes 66. It will be understood that any and all values and ranges therebetween are contemplated. Use of the term aligned is meant to mean that the holes 66 may be positioned in a variety of locations over the channels 26 to allow fluid communication through the hole 66 and into the channel 26. For example, the holes 66 may be positioned in a middle, a side, or around edges of the channels 26. Further, it will be understood that two or more holes 66 may be positioned proximate each channel 26.

Next, a step 74 of rotating a roller drum 78 is performed. The roller drum 78 may be fabricated from a tubular structure for a central portion of the roller drum 78 into which gudgeons are attached at each end to provide a mounting feature for bearing supports and attachment points for drive components. According to various examples, the roller drum 78 includes or defines one or more embossed features 82 on a surface 86 of the roller drum 78. For example, the roller drum 78 may define a plurality of embossed features 82. The embossed features 82 include a lip 90 which defines a well 94 between the lip 90 and the surface 86 of the roller drum 78. For purposes of clarity, the roller drum 78 is depicted as including a single line, or circumferential location, at which the plurality of embossed features 82 are positioned, but it will be understood that the roller drum 78 may include multiple pluralities of embossed features 82. For example, the roller drum 78 may include embossed features 82 extending across the length of the roller drum 78 in substantially the same manner or the embossed features 82 may be staggered relative to one another.

The lip 90 may be composed of a plastic, metal, composite material and/or combinations thereof. In polymeric examples, the lip 90 may be composed of an elastomeric material configured to defect, conform, deform or flex under force. The lip 90 may have a generally circular, oval, triangular, rectangular, square or higher order polygon shape. According to various examples, the lip 90 may have a substantially similar shape to a cross-sectional shape of the honeycomb body 14. According to various examples, the lip 90 may have a perimeter larger than a perimeter of the filter 10 and/or honeycomb body 14. In other words, the embossed features 82 and/or wells 94 may have a greater area than an area of an end surface of the filter 10. One or more of the lips 90 may have a suitable shape and perimeter to seat around the perimeter of the filter 10 or a sufficiently large shape and perimeter such that a gap extends between the lip 90 and the perimeter of the honeycomb body 14. It will be understood that in examples where the roller drum 78 includes a plurality of embossed features 82, one or more of the lips 90 of the embossed features 82 may have a different shape or material composition than one or more of the other lips 90. The lips 90 of the embossed features 82 may be raised, or proud, relative to the surface 86 of the roller drum 78 to define the well 94. The lips 90 may have a height of from about 0.1 mm to about 50 mm relative to the surface 86 of the roller drum 78. For example, the lips 90 may have a height of about 0.1 mm or greater, about 0.5 mm or greater, about 1 mm or greater, about 2 mm or greater, about 3 mm or greater, about 4 mm or greater, about 5 mm or greater, about 6 mm or greater, about 7 mm or greater, about 8 mm or greater, about 9 mm or greater, about 10 mm or greater, about 15 mm or greater, about 20 mm or greater, about 30 mm or greater, about 40 mm or greater or any and all values and ranges therebetween.

According to various examples, the surface 86 of the roller drum 78 within the embossed feature 82 may be lowered, or depressed, relative to the surface 86 exterior to the embossed feature 82. For example, the surface 86 may be depressed into the roller drum 78. As such, the well 94 may extend partially into the roller drum 78. The depth of the surface 86 within the embossed feature 82, relative to the surface 86 exterior to the embossed feature 82, may be from about 0.1 mm to about 30 mm. For example, the depth of the surface 86 may be about 0.1 mm or greater, about 0.5 mm or greater, about 1 mm or greater, about 2 mm or greater, about 3 mm or greater, about 4 mm or greater, about 5 mm or greater, about 6 mm or greater, about 7 mm or greater, about 8 mm or greater, about 9 mm or greater, about 10 mm or greater, about 20 mm or greater, about 30 mm or greater or any and all values and ranges therebetween. In examples where the surface 86 of the embossed feature 82 is depressed into the roller drum 78, the embossed feature 82 may omit or not include the lip 90.

Next, a step 100 of moving the filter 10 (or a plurality of filters 10) over the roller drum 78 (i.e., which is rotating from the action of step 74) to define a nip 104 between the roller drum 78 and the filter 10 is performed. According to various examples, the filter 10 may be moved over the embossed features 82 of the roller drum 78 to define the nip 104 between the one or more embossed features 82 and the mask layer 58. It will be understood that in high volume process runs of the method 50, the plurality of filters 10 may be moved over the rotating roller drum 78 with each of the filters 10 aligned and synchronized with the movement of an embossed feature 82. In such examples, the filters 10 may be supported by individual arms, a conveyor belt, or other structures to support the filters 10. The filters 10 may be moved at a rate and speed such that a filter 10 is present as each of the embossed features 82 reaches a top of the roller drum 78. Although depicted at a top of the roller drum 78, it will be understood that the nip 104 may be formed at a variety of locations around the roller drum 78 and that multiple nips 104 may be formed. For example, filters 10 may be moved over or proximate a variety of locations of the roller drum 78 sequentially or simultaneously.

The nip 104 may have a thickness (i.e., a minimum distance between the mask layer 58 and the embossed feature 82 (e.g., the surface 86 within the embossed feature 82)) of from about 0.01 mm to about 5 mm. For example, the nip 104 may have a thickness of about 0.01 mm, about 0.05 mm, about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 2.0 mm, about 3.0 mm, about 4.0 mm, about 5.0 mm or any and all values and ranges therebetween. According to various examples, the thickness of the nip 104 may be different across the length of the embossed feature 82. For example, the nip 104 defined between the center of the embossed feature 82 and the mask layer 58 may be greater or less than the nip 104 defined between a periphery of the embossed feature 82 and the mask layer 58. Further, the thickness of the nip 104 may be changed (e.g., through movement of the roller drum 78 and/or filter 10) as the filter 10 is moving across the embossed feature 82.

Next, a step 110 of inserting a plugging cement 114 in the nip 104 between the roller 78 drum and the mask layer 58 such that the roller drum 78 forces the plugging cement 114 through the plurality of holes 66 of the mask layer 58 into the plurality of channels 26 of the filter 10 is performed. Although described as separate steps for clarity, it will be understood that steps 100 and 110 may be performed substantially simultaneously such that the plugging cement 114 is inserted into the nip 104 formed by moving the filter 10 over the roller drum 78. As the motion of the filters 10 and the roller drum 78 is synchronized such that the filters 10 are presented to the roller drum 78 to meet the embossed features 82, step 110 may consist of inserting the plugging cement 114 in the nip 104 such that the one or more embossed features 82 forces the plugging cement 114 through the plurality of holes 66 of the mask layer 58 into the plurality of channels 26 of the filter 10.

The plugging cement 114 is highly viscous and non-Newtonian in nature and may typically exhibit shear thinning. The plugging cement 114 may be composed of a clay, an inorganic binder, water and a plurality of inorganic particles. According to various examples, the plugging cement 114 may include one or more additives (e.g., rheology modifiers, plasticizers, organic binders, foaming agents, etc.). According to various examples, the clay may include one or more colloidal clays, smectite clays, kaolinite clays, illite clays, and chlorite clays. The inorganic binder may take the form of silica, alumina, other inorganic binders and combinations thereof. The silica may take the form of fine amorphous, nonporous and generally spherical silica particles. At least one commercial example of suitable colloidal silica for the manufacture of the plugging cement 114 may include Ludox®. The plurality of inorganic particles within the plugging cement 114 may be composed of glasses, ceramics, glass-ceramics, cordierite and/or combinations thereof. According to various examples, the plurality of inorganic particles may have the same or a similar composition to that of the honeycomb body 14. For example, the plurality of inorganic particles may include cordierite and/or other materials which, upon sintering, form a porous structure.

Insertion of the plugging cement 114 into the nip 104 generates shear pressure within the plugging cement 114 such that the plugging cement 114 may thin, or decrease in viscosity, and pass through the holes 66 of the mask layer 58. As the plugging cement 114 is inserted between the embossed feature 82 and the filter 10 and/or mask layer 84, the plugging cement 114 is compressed under an increasing shear force as it reaches the nip 104. As the filter 10 approaches the roller drum 78 from a direction which is offset from a tangent of the surface 86 of the roller drum 78 within the embossed feature 82, the plugging cement 114 is forced into an increasingly small space as it approaches the nip 104. As such, a shear pressure builds within the plugging cement 114 with the peak, or maximum, shear pressure occurring at the nip 104.

The maximum shear pressure generated within the plugging cement 114 may be from about 1 psi to about 50 psi. For example the maximum shear pressure generated within the plugging cement 114 may be about 1 psi, about 2 psi, about 3 psi, about 4 psi, about 5 psi, about 6 psi, about 7 psi, about 8 psi, about 9 psi, about 10 psi, about 20 psi, about 30 psi, about 40 psi, about 50 psi or any and all values and ranges therebetween. The pressure generated in the plugging cement 114 is a function of the thickness of the plugging cement 114 and the thickness of the nip 104. In general, the thicker the plugging cement 114 and the thinner the nip 104, the more pressure is generated within the plugging cement 114. As such, use of a thinner nip 104 or a thicker plugging cement 114 may generate greater shear pressures within the plugging cement 114.

The shear pressure may be generated in the plugging cement 114 at a rate of from about 1 psi/s to about 50 psi/s. For example, the shear pressure generated within the plugging cement 114 at a rate of about 1 psi/s, about 2 psi/s, about 3 psi/s, about 4 psi/s, about 5 psi/s, about 6 psi/s, about 7 psi/s, about 8 psi/s, about 9 psi/s, about 10 psi/s, about 20 psi/s, about 30 psi/s, about 40 psi/s, about 50 psi/s or any and all values and ranges therebetween. The rate of shear pressure generation in the plugging cement 114 is a function of the speed of rotation of the roller drum 78 as well as the diameter of the roller drum 78. For example, an increasing rotation rate of the roller drum 78 leads to an increased rate of shear pressure generation within the plugging cement 114 as the plugging cement 114 is forced into the nip 104 faster. Similarly, a decreased diameter of the roller drum 78 causes the surface 86 within the embossed feature 82 to converge to the nip 104 quicker (i.e., due to a lower radius of curvature) thereby increasing the rate at which the shear pressure is generated within the plugging cement 114. As the diameter of the roller drum 78 increases, the shape of the converging region (e.g., the nip 104) changes. Such changes in the diameter of the roller drum 78 allow for a change in the pressure profile generated to accommodate line speed changes along with different rheological properties of materials used in the process. Such a feature may be advantageous in allowing a flexibility in the implementation of the method 50 by allowing a greater variability of other process parameters.

Step 110 of inserting the plugging cement 114 into the nip 104 may be carried out in a variety of manners. According to various examples, shown as steps 110A and 110B, the plugging cement 114 is inserted into the nip 104 on a carrier web 120. In such an example, step 110 may include an action of conveying the plugging cement 114 along the carrier web 120 through the nip 104 between the embossed features 82 of the roller drum 78 and the mask layer 58 such that the embossed features 82 force the plugging cement 114 through the plurality of holes 66 of the mask layer 58 into the plurality of channels 26 of the filter 10. The plugging cement 114 may be positioned on the carrier web 120 as a plurality of discontinuous, or discrete, portions (step 110A) or as a single continuous portion (step 110B).

The carrier web 120 may be formed of a polymeric material, elastomeric material, cloth material, fiber (e.g., natural and/or synthetic) material, metal, other materials and/or combinations thereof. According to various examples, the carrier web 120 may be configured to stretch and/or deform to an extent as it moves through the nip 104. The carrier web 120 may be part of a larger conveying system incorporating or more rollers which move, wind and/or change directions of the carrier web 120. The carrier web 120 may be a single continuous structure of a plurality of smaller carrier webs 120 coupled together. In such an example, the carrier web 120 may be continuously looped during operation of the method 50. According to various examples, the carrier web 120 may be a discontinuous structure. In such an example, the carrier web 120 may be spooled off a roller and re-spooled onto another roller. At the end of the method 50, the re-spooled carrier web 120 may be cleaned or reconditioned and reused for another run of the method 50. As explained above, the carrier web 120 may carry or transport the plugging cement 114 to the nip 104 such that the plugging cement 114 is inserted in the nip 104 between the embossing features 82 and the mask layer 58.

In the depicted example of step 110A, the plugging cement 114 may be positioned on the carrier web 120 in a discontinuous or discrete manner. For example, the plugging cement 114 may be disposed as patties or portions on the carrier web 120. The patties of plugging cement 114 may be circular, triangular, square, rectangular or higher order polygon shapes. It will be understood that one or more of the patties of plugging cement 114 may have a different shape than other patties of the plugging cement 114. The patties of plugging cement 114 may have a thickness of from about 1 mm to about 20 mm. For example, the patties of plugging cement 114 may have a thickness of about 1 mm, about 2 mm, about 3 mm, about 4 mm, about 5 mm, about 6 mm, about 7 mm, about 8 mm, about 9 mm, about 11 mm, about 12 mm, about 13 mm, about 14 mm, about 15 mm, about 16 mm, about 17 mm, about 18 mm, about 19 mm, about 20 mm or any and all values and ranges therebetween. According to various examples, the patties of plugging cement 114 may have a shape and thickness substantially similar to that of the well 94 of the embossed feature 82. Such a feature may be advantageous in allowing the entirety of the patty to be surrounded by the lip 90 and pressed into the filter 10 through the mask layer 58. For example, the depressed surface 86 and/or the lip 90 may prevent the plugging cement 114 from being squeezed out of side of the nip 104 such that a greater amount of the plugging cement 114 enters the filter 10. The plugging cement 114 may be dispensed as a metered mass or volume of cement 114 onto the carrier web 120 through a progressive cavity pump mounted on a traversing mechanism that deposits cement in a predetermined pattern onto the carrier web 120. In other examples, the plugging cement 114 may be provided to the carrier web 120 in preformed patties such that the patties may be simply placed on the carrier web 120.

In operation, movement of the carrier web 120 and the roller drum 78 may be synchronized such that the patties of the plugging cement 114 meet the nip 104 at the same time as an embossed feature 82 and the filter 10 reaches the nip 104. In other words, as the patty of plugging cement 114 reaches the nip 104, the roller drum 78 contacts the embossed feature 82 to the carrier web 120 on an opposite side of the carrier web 120 than the plugging cement 114 is positioned such that the lip 90 seats on the filter 10 and shear pressure builds within the plugging cement 114 to press the plugging cement 114 through the holes 66 of the mask layer 58 and into the channels 26 of the filter 10. It will be understood that motion of the filter 10 which may generally resist the insertion of the plugging cement 114 into the filter 10 may be resisted by constraining the filter 10. For example, movement of the filter 10 in a direction away from the roller drum 78 may be resisted such that the plugging cement 114 enters the channels 26. According to various examples, the raised lip 90, which may outline the circumference of the filter 10, may form a seal between the plugging cement 114, the carrier web 120 and the filter 10 that allows the shear pressure to build while preventing the leakage of the plugging cement 114 in an outward direction.

In the depicted example of step 110B, the plugging cement 114 may be provided on the carrier web 120 as a single continuous body. It will be understood that while the plugging cement 114 may be continuous, the plugging cement 114 may vary in thickness or width as it is dispensed onto the carrier web 120. For example, portions of the plugging cement 114 not expected to contact a filter 10 may be thinner or smaller. Such a feature may be advantageous in decreasing a waste of the plugging cement 114 and/or eliminating start and stop defects in the plugging cement 114 as it is placed on the carrier web 120. According to various examples, the continuous portion of plugging cement 114 may be wider than the filter 10. The plugging cement 114 may be dispensed onto the carrier web 120 through a progressive cavity pump mounted on a traversing mechanism that deposits cement in a substantially continuous manner onto the carrier web 120.

In operation, movement of the carrier web 120 and the roller drum 78 may allow the embossed feature 82 to contact an opposite side of the carrier web 120 than the plugging cement 114 and press portions of the plugging cement 114 into the filter 10. In other words, as the lip 90 of the embossed feature 82 seats on the filter 10, the plugging cement 114 caught between the carrier web 120 and the filter 10 is pressed through the holes 66 in the mask layer 58 and into the channels 26. It will be understood that in continuous examples of the plugging cement 114, the lip 90 of the embossed feature 82 may not be necessary or may be smaller relative to other examples as the plugging cement 114. For example, as the width of the plugging cement 114 on the carrier web 120 may be wider than the filter 10, the excess plugging cement 114 may provide sufficient constraint on the plugging cement 114 to generate the requisite shear pressure in the plugging cement 114 without the lip 90 needing to seat around the filter 10. Excess plugging cement 114 may be removed from the carrier web 120 (e.g., through a blade, scraper or other method) and recycled to be reapplied to the carrier web 120.

According to various examples, the carrier web 120 may be omitted in an example 110C of step 110. In such an example, the wells 94 of the embossed features 82 may be filled with the plugging cement 114 such that contact between the embossed feature 82 and the filter 10 presses the plugging cement 114 through the mask layer 58. In other words, step 110C may include the action of positioning the plugging cement 114 within the well 94 of the embossed feature 82. The plugging cement 114 may be positioned within the well 94 in a variety of manners. In a first example, a preformed patty or portion of plugging cement 114 may be placed into the well 94. For example, the patty of plugging cement 114 may have generally the same proportions as the well 94, or the patty may be larger. In examples where the patty is larger than the well 94, the lip 90 may sever the excess plugging cement 114 as the patty is placed over the embossed feature 82. According to yet other examples, the plugging cement 114 may be dispensed directly into the wells 94 of the embossed features 82. In such examples, the plugging cement 114 may be dispensed from an exterior of the roller drum 78 and/or from an interior of the roller drum 78. In exterior examples, one or more dispensing nozzles may be positioned proximate the roller drum 78 and configured to dispense the plugging cement 114 into the wells 94 as the roller drum 78 is rotated. In interior filling examples, the surface 86 within the well 94 may define a plurality of slits or openings to an interior of the roller drum 78. A dispensing nozzle (e.g., a slot die nozzle) may be positioned within the roller drum 78 such that as the slits of the surface 86 pass over the dispensing nozzle, plugging cement 114 is extruded from the dispensing nozzle through the slits in the surface 86 and into the well 94 of the embossed features 82.

Next, a step 130 of stripping the mask layer 58 from the filter 10 is performed. Once the filter 10 has passed by the roller drum 78 and the plugging cement 114 has been pushed into the channels 26, the carrier web 120 and mask layer 58 may be directed over a roller or other device that provides a constant or variable stripping angle to separate the mask layer 58 and the carrier web 120 from the filter 10. The diameter of the stripping roller can be adjusted to vary the stripping angle. It will be understood that the carrier web 120 and the mask layer 58 may be stripped in separate steps by separate rollers without departing from the teachings provided herein. Once the carrier web 120 is stripped from the filter 10, excess plugging cement 114 positioned on the carrier web 120 may be removed and recirculated as explained above. Further, if the mask layer 58 is adhered to the carrier web 120, the mask layer 58 may be stripped from the carrier web 120.

Once the mask layer 58 and the carrier web 120 have been stripped from the filter 10, the plugging cement 114 located in the plurality of channels 26 may be sintered, fired or otherwise cured. The fired plugging cement 114 within the channels 26 forms the plugs 30 such that the filter 10 may be used to filter fluids such as liquids and gases as outlined above.

Use of the roller drum 78 to press the plugging cement 114 into the filters 10 offers a continuous process to form the plugs 30 within the filter 10. Further, as the rate of rotation of the roller drum 78, as well as the speed at which the plugging cement 114 is fed to the nip 104, may be variably controlled (e.g., increased or decreased), the method 50 may offer a wide variety of production rates of the filters 10. As the method 50 may employ a variety of techniques to quickly deliver the plugging cement 114 to the nip 104 shortly after formation or dispensing of the plugging cement 114, changes in rheological properties of the cement 114 may be discounted. Conventional techniques of plugging wall flow filters often suffer from changes in rheological properties which affect plug formation quality (e.g., depth, porosity, variability, etc.) due to long lead times between dispensing of the plugging cement 114 and application to the filter 10. As the method 50 has a short time frame between dispensing of the plugging mixture 114 (e.g., onto the carrier web 120 and/or into the well 94), plug quality is improved. As the diameter of the roller drum 78 may be changed, the flow rate of the plugging cement 114 into the plurality of channels 26 may be adjusted. Such a feature may be advantageous in controlling quality and variability of the resulting plugs 30. As a number of process variables (e.g., size of the nip 104, the diameter of the roller drum 78, the rotation speed of the roller 78) may be changed, a variety of plugging cements 114 which have different rheological properties may be utilized offering greater process flexibility. Use of the lip 90 of the embossed features 82 may allow for an increased shear pressure to build within the plugging cement 114 such that shallow or smaller channels 26 near a periphery of the filter 10 may be filled. Such features as thickness, durometer and shape of the lips 90 may be controlled to improve the uniformity as increased leak prevention of the plugging cement 114 may be obtained. As a metered amount of plugging cement 114 is delivered to the nip 104, less waste plugging cement 114 may be realized as compared to conventional methods of forming wall flow filters 10. Such a feature may be advantageous in decreasing both production costs as well as manufacturing complexity of the forming the filters 10. As the method 50 includes a plurality of different variables (e.g., diameter of the roller drum 78, rheological properties plugging cement 114, initial profile (e.g., patty shape, thickness, continuous vs. discrete) of the plugging cement 114, rotation speed of the roller drum 78), the method 50 can be optimized based on a variety of considerations allow for less waste and more uniform filters 10.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

What is claimed is:

1. A method of plugging a honeycomb body, comprising the steps of:
    applying a mask layer to the honeycomb body defining a plurality of channels, wherein the mask layer defines a plurality of holes aligned with the plurality of channels;
    rotating a roller drum;
    conveying a plugging cement disposed on one side of a carrier web, wherein the carrier web is disposed between the mask layer and the roller drum;
    moving the honeycomb body over the roller drum to define a nip between the roller drum and the honeycomb body; and
    inserting the plugging cement in the nip between the roller drum and the mask layer, wherein the roller drum contacts the carrier web on an opposite side to the one side on which the plugging cement is disposed, such that the roller drum forces the plugging cement through the plurality of holes of the mask layer into the plurality of channels of the honeycomb body.

2. The method of claim 1, wherein the roller drum comprises an embossed feature.

3. The method of claim 2, wherein the embossed feature comprises a lip having a perimeter larger than a perimeter of the honeycomb body.

4. The method of claim 1, wherein the roller drum comprises a plurality of embossed features, wherein each of the embossed features comprises a lip to define a well.

5. The method of claim 1, wherein the step of conveying the plugging cement along the carrier web further comprises conveying the plugging cement along the carrier web in discrete portions.

6. The method of claim 1, wherein the step of conveying the plugging cement along the carrier web further comprises conveying the plugging cement along the carrier web in a continuous portion.

7. The method of claim 2, further comprising the step of:
    contacting the embossed feature to the carrier web on the opposite side of the carrier web than where the plugging cement is positioned.

8. A method of plugging a honeycomb body, comprising the steps of:
    applying a mask layer to the honeycomb body defining a plurality of channels, wherein the mask layer defines a plurality of holes aligned with the plurality of channels;
    rotating a roller drum defining one or more embossed features;
    moving the honeycomb body over the embossed features of the roller drum to define a nip between the one or more embossed features and the mask layer; and
    inserting a plugging cement in the nip such that the one or more embossed features forces the plugging cement through the plurality of holes of the mask layer into the plurality of channels of the honeycomb body;
    wherein a carrier web is disposed between the mask layer and the roller drum, and the plugging cement is disposed on one side of the carrier web facing the mask layer; and
    wherein the roller drum contacts the carrier web on an opposite side to the one side on which the plugging cement is disposed.

9. The method of claim 8, wherein the step of inserting the plugging cement in the nip between the embossed features of the roller drum and the mask layer further comprises generating a shear pressure of from about 1 psi to about 50 psi in the plugging cement.

10. The method of claim 8, wherein the step of inserting the plugging cement in the nip between the embossed features of the roller drum and the mask layer further comprises generating a shear pressure within the plugging cement of from about 1 psi/s to about 50 psi/s in the plugging cement.

11. The method of claim 8, further comprising the step of:
    stripping the mask layer from the honeycomb body.

12. The method of claim 8, wherein the one or more embossed features each have a greater area than an area of the honeycomb body.

13. A method of plugging a honeycomb body, comprising the steps of:
    applying a mask layer to the honeycomb body defining a plurality of channels, wherein the mask layer defines a plurality of holes aligned with the plurality of channels;
    rotating a roller drum defining a plurality of embossed features;
    moving the honeycomb body over the plurality of embossed features of the roller drum to define a nip between plurality of embossed features and the mask layer; and
    conveying a plugging cement along a carrier web through the nip between the embossed features of the roller drum and the mask layer such that the embossed features contact the carrier web on a side opposite to the plugging cement and force the plugging cement through the plurality of holes of the mask layer into the plurality of channels of the honeycomb body.

14. The method of claim 13, wherein the roller drum defines the plurality of embossed features, wherein each of the embossed features comprise a lip having a perimeter larger than a perimeter of the honeycomb body.

15. The method of claim 14, wherein the step of conveying the plugging cement along the carrier web further comprises conveying the plugging cement along the carrier web in discrete portions.

16. The method of claim 13, wherein the step of conveying a plugging cement along a carrier web through the nip between the embossed features of the roller drum and the mask layer further comprises generating a shear pressure of from about 1 psi to about 50 psi in the plugging cement.

17. The method of claim 16, wherein the step of conveying a plugging cement along a carrier web through the nip between the embossed features of the roller drum and the mask layer further comprises generating a shear pressure within the plugging cement of from about 1 psi/s to about 50 psi/s in the plugging cement.

\* \* \* \* \*